United States Patent [19]
Cheng

[11] Patent Number: 5,904,327
[45] Date of Patent: May 18, 1999

[54] DETACHABLE WRIST SUPPORT OF KEYBOARD

[75] Inventor: Chun-Wei Cheng, Taipei, Taiwan

[73] Assignee: Behavior Tech Computer Corp., Taipei, Taiwan

[21] Appl. No.: 09/000,621

[22] Filed: Dec. 30, 1997

[51] Int. Cl.[6] ............................. B43L 15/00; B68G 5/00
[52] U.S. Cl. .................... 248/118.1; 248/118; 248/118.3
[58] Field of Search ............................. 248/118.1, 118.3, 248/918, 292.12, 118; 403/326, 329

[56] References Cited

U.S. PATENT DOCUMENTS

| | | | |
|---|---|---|---|
| 5,375,800 | 12/1994 | Wilcox et al. | 248/118.1 |
| 5,513,824 | 5/1996 | Leavitt et al. | 248/118.3 |
| 5,570,268 | 10/1996 | Selker | 361/683 |
| 5,816,839 | 10/1998 | Chen | 248/118 |

*Primary Examiner*—Leslie A. Braun
*Assistant Examiner*—David Heisey
*Attorney, Agent, or Firm*—Rosenberg, Klein & Bilker

[57] ABSTRACT

A wrist support is detachably connectable to a computer keyboard by means of two connector plates which are received within two cavities formed on the wrist support and movable between a stow position where the connector plates are completely received within the cavities and an extended position where an end of the connector plates is extended out of the wrist support to be pivotally connected to the keyboard. Each of the cavities has two side walls each having two spaced flanges defining therebetween a rail for receiving and guiding a lateral side edge of the plate so as to allow the movement of the plate within the cavity. The plate has first paws which are engageable with ends of the flanges to define the extended position and a second paw engageable with stop blocks provided in the cavity to define the stowed position. The second paw is releasable from the stop blocks to allow the connector plate to move from the stowed position to the extended position. By means of such a detachable connection, the keyboard and the wrist support may be packed and sold separately and allow the general consumers to selectively mount the wrist support to the keyboard.

3 Claims, 5 Drawing Sheets

DETACHABLE WRIST SUPPORT OF KEYBOARD

BACKGROUND OF THE INVENTION

1. Field of the Invention

The present invention relates generally to a wrist support of a computer keyboard which provides a support to the computer user's wrists and in particular to a wrist support which is detachably and selectively mounted to the keyboard by means of two connectors which are releasably connected between the keyboard and the wrist support and are selectively retractable back into the wrist support so as to allow the wrist support and the keyboard to be separable from each other to facilitate manufacture, storage and transportation and to provide the general consumers with options in selectively mounting the wrist support to the keyboard.

2. Related Arts

In operating a computer, most of the computer users make use of a keyboard as a major input device. The usual way of using the keyboard is to have the palms and fingers in contact with the keyboard but leaving the wrists hanging in the air without appropriate support. This causes strains on the muscles of the user's wrists and arms and may damage the wrists and arms with long term use of the computer.

To solve such a problem, some of the keyboards are provided with a wrist support to support the computer user's wrists, protecting the muscles of the wrists and the arms from over-stressing. Conventionally, the wrist support is formed integrally with the keyboard and is not detachable from the keyboard. This certainly increases the overall size of the keyboard and is thus disadvantageous for storage and transportation. Furthermore, the keyboard having wrist support integrally formed thereon requires a different mould to manufacture so that an additional cost is needed.

Thus, it is desirable to provide an improved design of wrist support of a keyboard design which allows the wrist support to be selectively and detachably connected to the keyboard in order to overcome the above problems. In this way, no significant modification on the original design and mould of the keyboard is needed and the wrist support may be manufactured separately and then selectively mounted to the keyboard by the general consumers. The cost is thus reduced and the storage and transportation enhanced.

SUMMARY OF THE INVENTION

Therefore, an object of the present invention is to provide a wrist support which is detachably connectable to a keyboard by means of releasable connectors so as to allow the wrist support to be selectively attached to/detached from the keyboard.

Another object of the present invention is to provide a wrist support which is detachably connectable to a keyboard so as to be capable to pack and sell separately and thus facilitate the storage and transportation thereof.

In accordance with the present invention, the wrist support has two cavities formed thereon each receiving therein a connector plate, the cavities having two spaced flanges on each of two side walls of the cavity to define rails for accommodating sliding movement of the connector plates which are thus moveable between a stowed position defined by engagement between stop blocks arranged inside the cavity and paws on the connector plates where the connector plates are completely received inside the cavities and an extended position where an end of the connector plates extends out of the wrist support to releasably and pivotably connect to the keyboard so as to allow the wrist support to be separable from the keyboard and the connector plate completely receivable within the wrist support.

The design of the wrist support in accordance with the present invention allows the original keyboard configuration and mould for manufacturing the keyboard to be maintained and the wrist support is manufactured separately and then releasbly connected to the keyboard.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
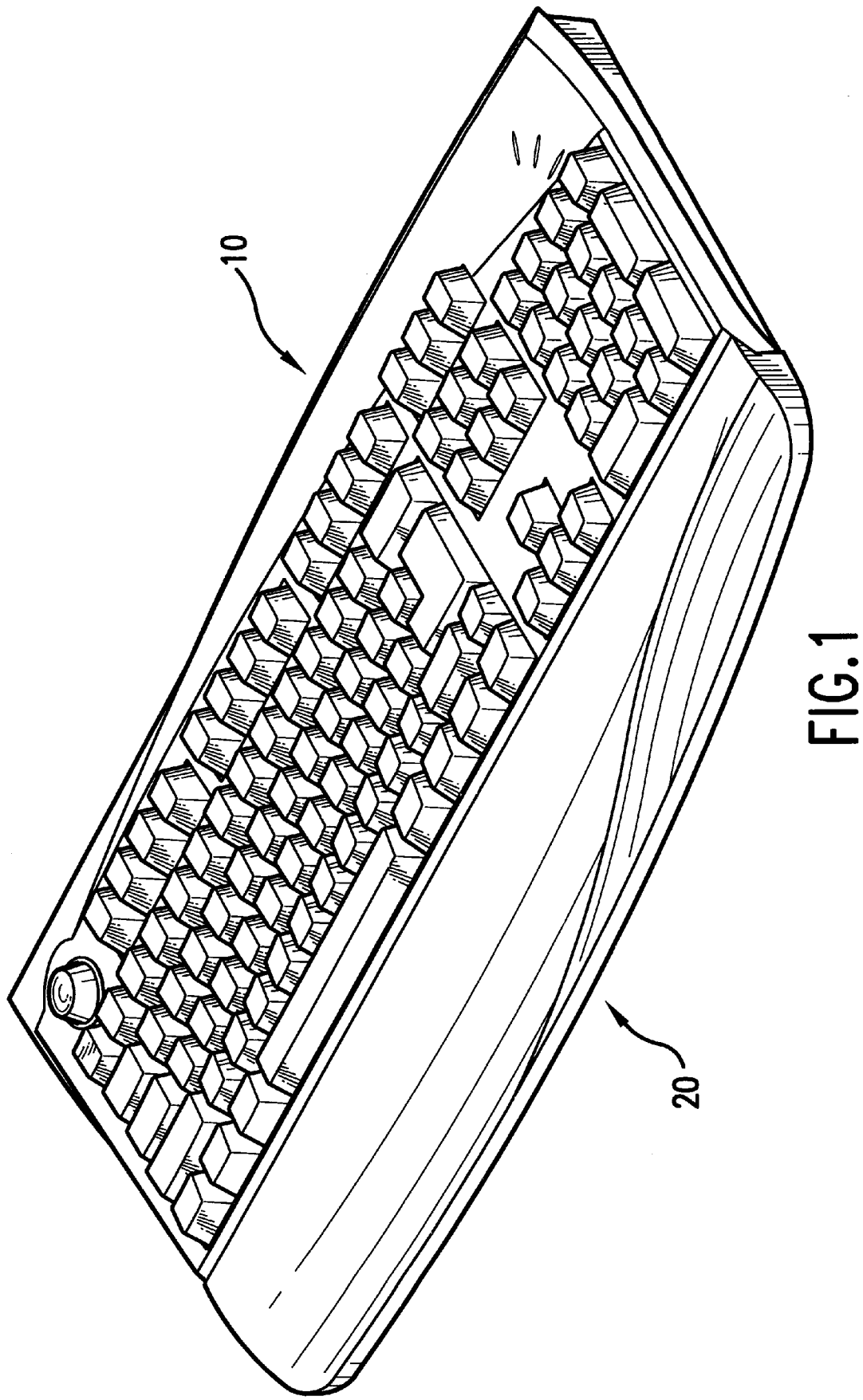
FIG. 1 is a perspective view showing a computer keyboard to which a wrist support constructed in accordance with the present invention is detachably connected.

With reference to the drawings and in particular to FIGS. 1–4, wherein a computer keyboard, generally designated at 10, incorporating a wrist support constructed in accordance with the present invention, generally designated at 20, is shown, the wrist support of the present invention 20 is detachably connected to the keyboard 10 by means of two connectors 30, which have one end side pivoted to the keyboard 10 and the opposite end side slidably received within the wrist support 20. This will be further described.

As shown, the keyboard 10 comprises a plurality of legs 11, preferably two, which are mounted to the bottom of the keyboard 10 in the proximity of a rear edge of the keyboard 10 and are rotatable between an stowed position where the legs 11 are positioned overlapping the bottom of the keyboard 10 and a standing position where the legs 1 1 are at an angle, preferably substantially right angle, with respect to the bottom of the keyboard 11 so as to change the inclination of the top side of the keyboard 11 on which the keys are arranged. The legs 11 are known and will not be further described herein. In the context of the description, the term "rear" means a direction toward the computer or away from the computer user in a usual way that the user uses the keyboard to access the computer, and opposite to the "rear", the "front" indicating a direction toward the computer user.

The keyboard 10 also has two slots 12 formed on the bottom side thereof in the proximity of a front edge which is substantially opposite to the rear side of the keyboard 10. Each of the slots 12 has two end walls each having a recess formed thereon to respectively rotatably receive an end of a pivot 32 of the respective connector 30 for pivotally attaching the connector 30 to the keyboard 10. This will be further described.

Figure 2:
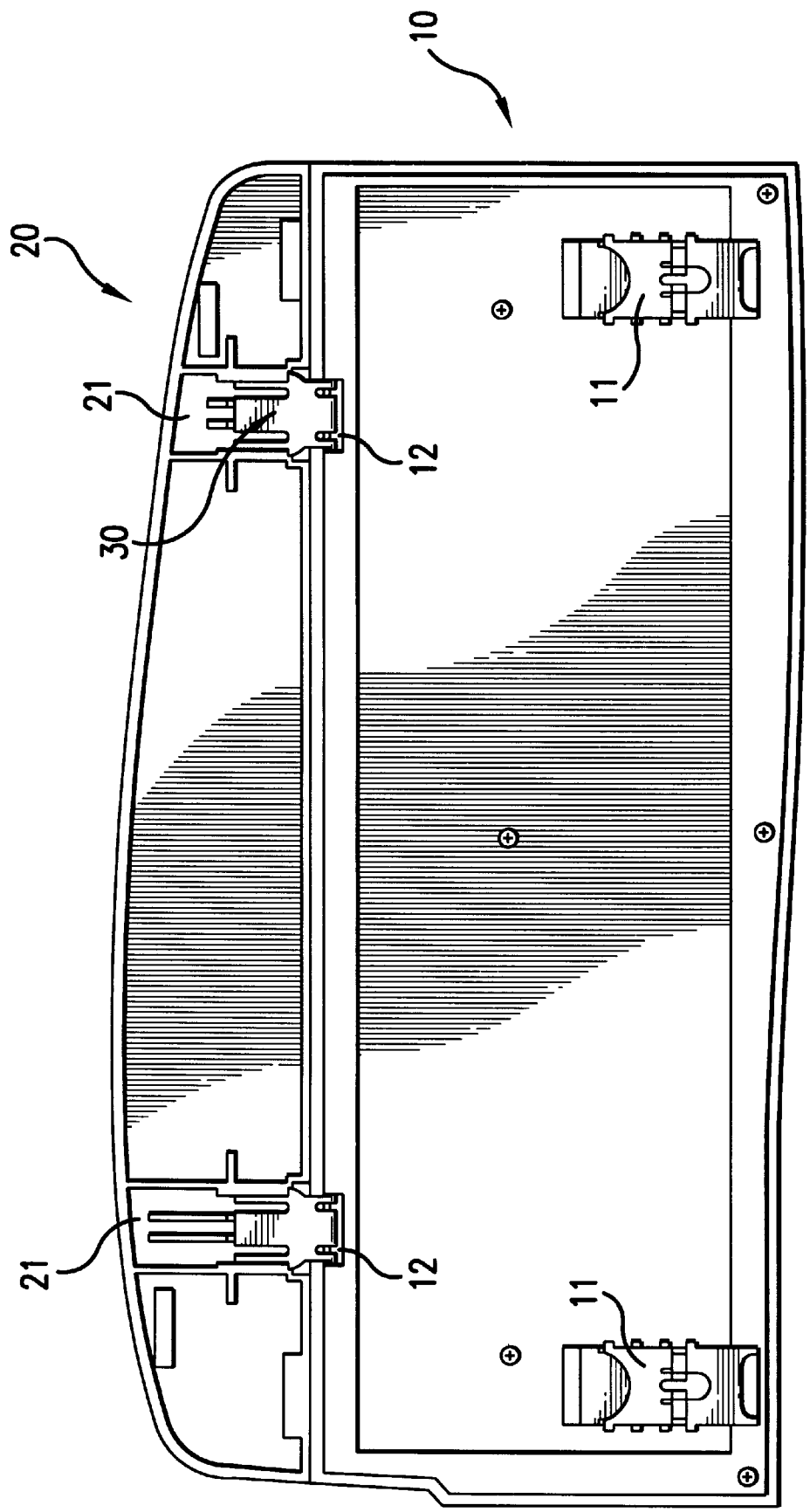
FIG. 2 is bottom view of the keyboard shown in FIG. 1 with the wrist support attached thereto.
Figure 3:
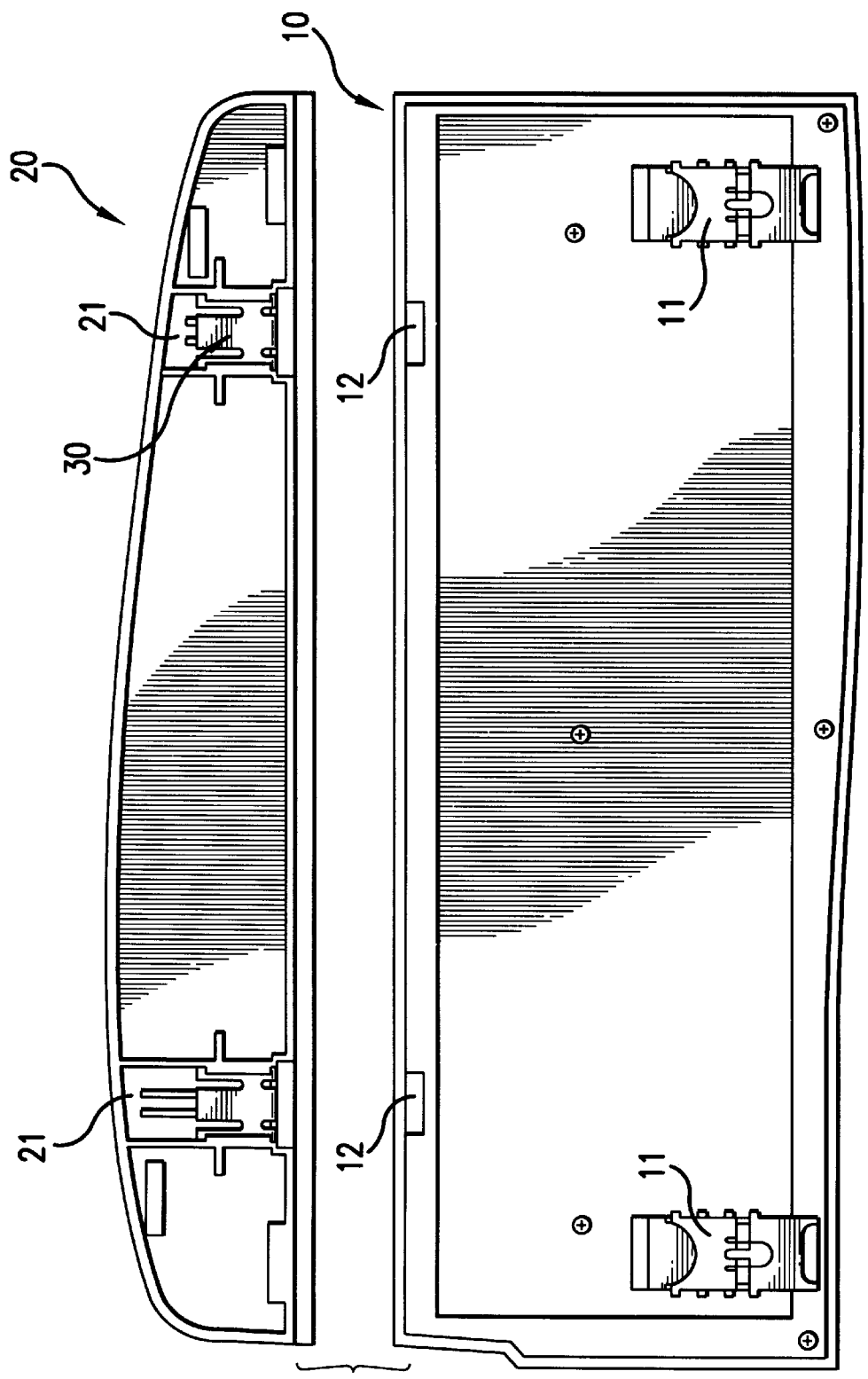
FIG. 3 is bottom view of the keyboard shown in FIG. 1 with the wrist support detached therefrom.
Figure 4:
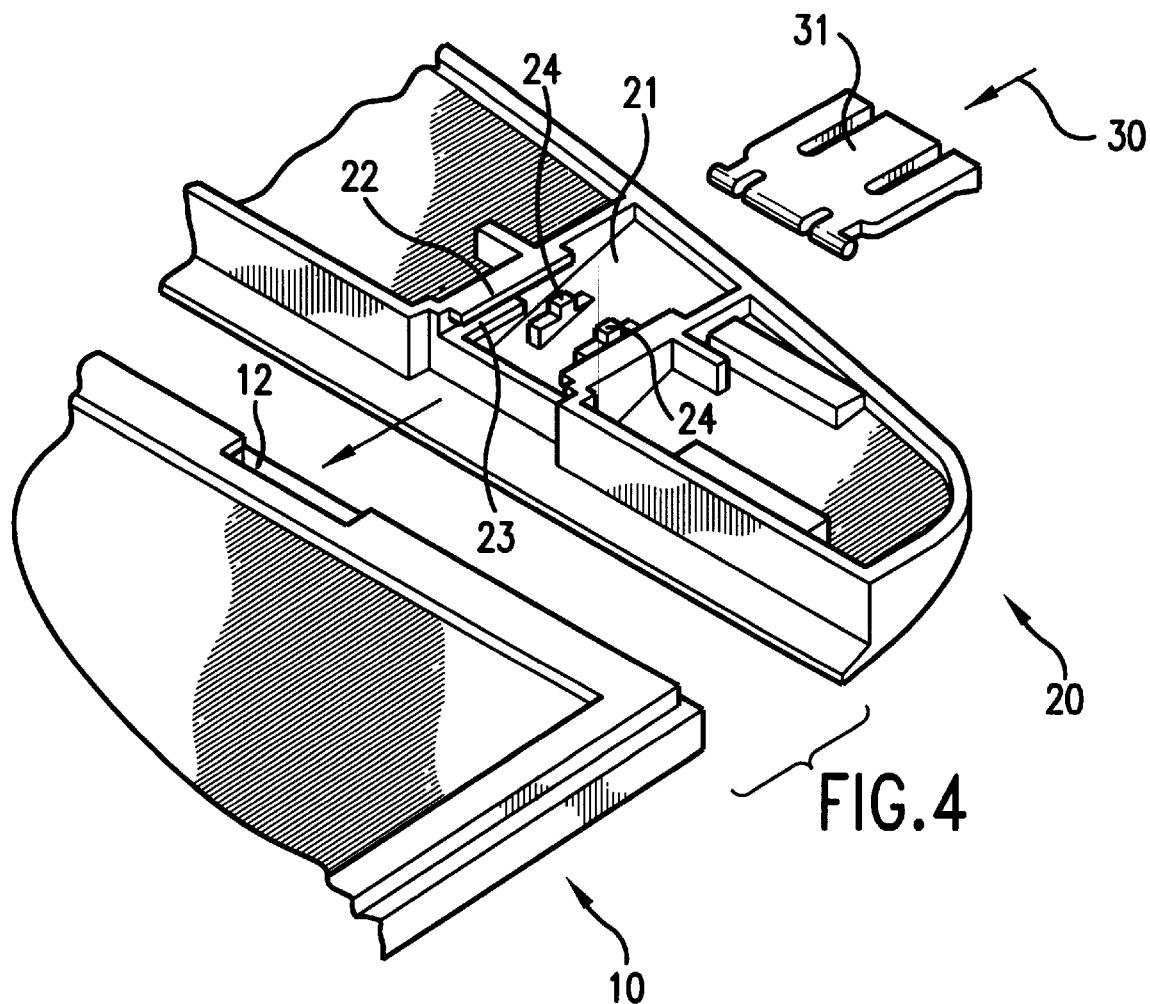
FIG. 4 is an enlarged view of a portion of the keyboard and the wrist support of the present invention and FIG. 4A is a further enlarged view of the connector plate that detachably connects the wrist support to the keyboard.

As shown in FIGS. 2–4, the wrist support 20 has formed on a bottom surface thereof two cavities 21 corresponding to the two slots 12 of the keyboard 10. Each of the cavities 21 is defined by a bottom face and two spaced side walls extending from the bottom face. Each of the side walls of the cavity 21 has a first elongated flange 22 and a second elongated flange 23 formed thereon and spaced from each other and extending substantially parallel with each other and parallel with the bottom surface of the wrist support 20. Preferably, the first flange 22 has a length greater than the second flange 23 and extending beyond an inner end of the second flange 23. The first and second flanges 22 and 23 of each of the side walls of each of the cavities 21 define a rail therebetween for receiving and guiding the respective connector 30 to move with respect thereto and thus with respect to the wrist support 20. Each of the cavities 21 also comprises two stop blocks 24 formed on the bottom face thereof.

As shown in FIG. 4, the connectors 30 comprise a plate-like member having a width corresponding to the spacing between the two side walls of the respective cavity 21 and has a thickness corresponding to the spacing between the first and second flanges 22 and 23 of each of the side walls so as to allow two opposite lateral side edges of the connector plate 30 to be slidably received within the rails defined on the two side walls of the cavity 21 by the first and second flanges 22 and 23.

Figure 4A:
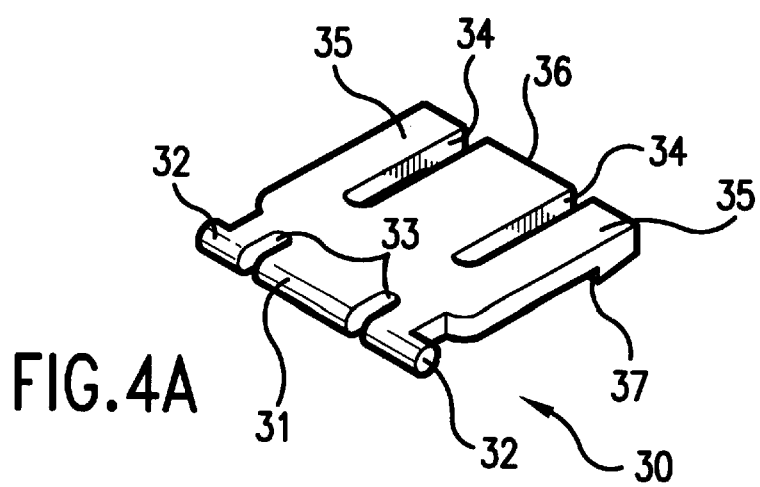

Also referring to FIG. 4A, the connector plate 30 has a rear edge or end on which two notches 33 are formed so as to define a central portion and two side portions, each of the side portions of the rear edge having a sideways pin-like projection 32 which defines the pivot of the connector 30 and are rotatably received within the recesses that are formed on the end walls of the respective one of the slots 12 formed on the keyboard 10 so as to pivot the connector 30 to the keyboard 10.

The connectors 30 are made of such a material that is capable to undertake an elastic deformation so that by means of the provision of the notches 33, the side portions of the rear edge of the connectors 30 are deflectable toward the central portion. This allows the projections 32 to be positioned into the end wall recesses of the respective slot 12 of the keyboard 10 and also helps maintaining the projections 32 within the end wall recesses of the slot 12 so as to keep the connector 30 to the keyboard 10.

The connector 30 is also provided with two notches 34 on the front edge or end thereof to define a central section 36 and two side sections 35, both being deflectable in a direction substantially normal to the connector plate 30. Each of the central section 35 and the side sections 36 is provided with a paw or barb 37, wherein the paw 37 of the central section 36 is engageable with the stop blocks 24 (which defines a stowed position of the connector 30), while the paws 37 of the side sections 35 are respectively engageable with the inner ends of the second flanges 23 (which defines an extended position of the connector 30).

Figure 6:
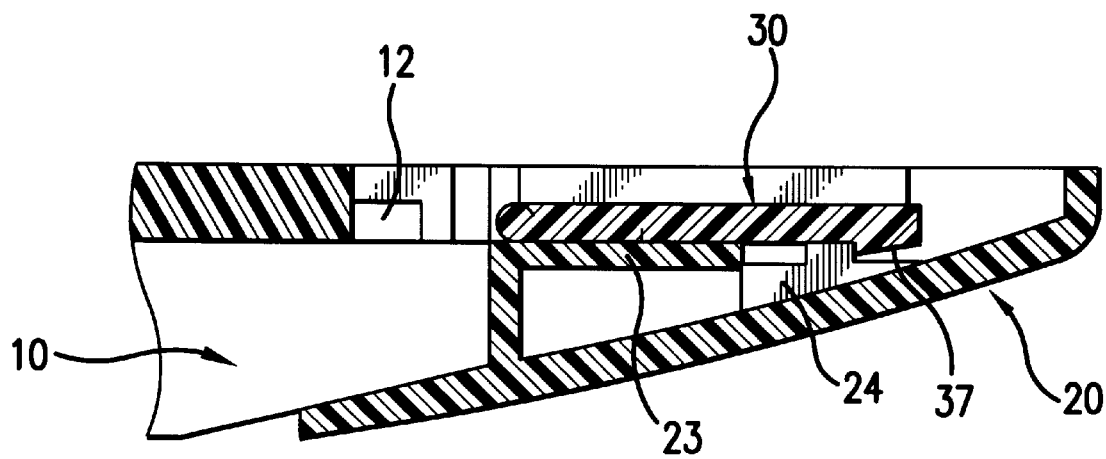
FIG. 6 is a view similar to FIG. 5, but showing the connector plate at a stowed position where it is completely received within the wrist support.

In assembly, the connectors 30 are respectively received within the cavities 21 by having the lateral side edges thereof that define the width of the plate 30 slidably received within the rails defined by the flanges 22 and 23 on the side walls of the cavities 21 and moved in such a direction toward a rear edge of the wrist support 20 to such a position where the paws 37 of the central sections 36 of the connector plates 30 engage the stop blocks 24 of the cavities 21 so as to position the connector plates 30 completely within the cavities 21 of the wrist support 20, as shown in FIGS. 3 and 6, which is defined as the stowed position of the connectors 30.

Figure 5:
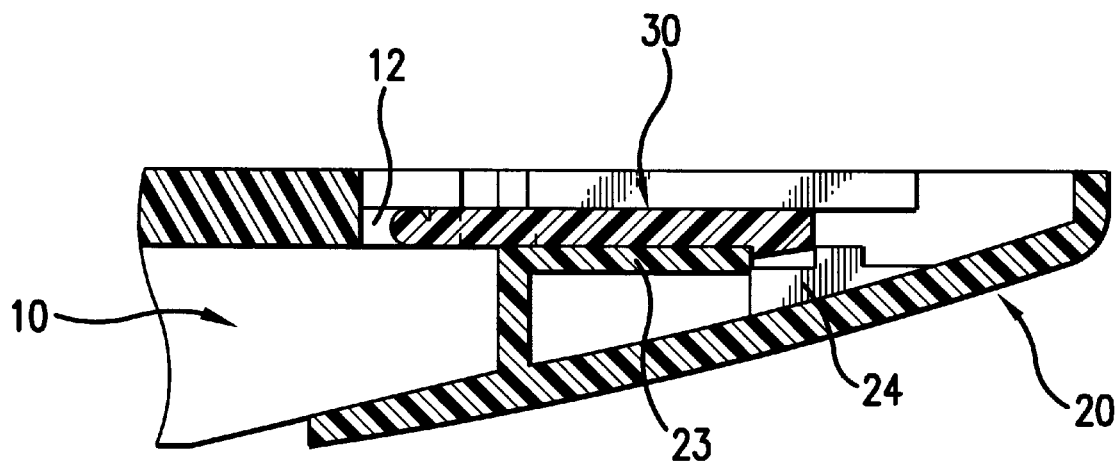
FIG. 5 is an enlarged cross-sectional view of a portion of the keyboard showing that the wrist support is connected to the keyboard by means of the connector plates which are located at an extended position.

In order to attach the wrist support 20 to the keyboard 10, the central sections 36 of the connector plates 30 are deflected in such a way to disengage the paws 37 thereof from the stop blocks 24 and this allows the connector plates 30 to be moved away from the stowed position and further toward and eventually extending out of the rear edge of the wrist support 20 and by deflecting the projections 32 that are extended beyond the rear edge of the wrist support 20, the projections 32 may be positioned into the end wall recesses of the slots 12 of the keyboard 10 so as to pivot the connectors 30 and thus the wrist support 20 to the keyboard 10. The second flanges 23 of the cavities 21 of the wrist support 20 are arranged to have the inner ends thereof engaged by the paws 37 of the side sections 35 of the connector plates 30 when the projections 32 are received within the end wall recesses of the slots 12 of the keyboard 10, as shown in FIGS. 2 and 5 and thus securely attaching the wrist support 20 to the keyboard 10 and this is the extended position of the connectors 30.

By deflecting the projections 32 again toward each other, the connectors 30 are allows to disengage from the keyboard 10 and thus detach the wrist support 20 from the keyboard 10. This provides a detachable wrist support which allows a user to selectively mount the wrist support 20 to the keyboard 10. In addition, with such an arrangement, since the wrist support 20 is not integrally formed with the keyboard 10, the original keyboard design that has no wrist support integrally formed therewith may be maintained and the mould that is used to moulding-manufacture the keyboard casing may also be used without significant modification. Moreover, since the original specification of the keyboard is maintained, the keyboard and the wrist support may be sold separately, providing the consumers with different options.

Although there are shown two connectors used to connect the wrist support to the keyboard, it is possible for those skilled in the art to use more than two such connectors to connect the wrist support to the keyboard.

The above description is made with respect to the preferred embodiment of the present invention and for those skilled in the art, it is possible to make a variety of modifications and changes to the above-described specific embodiment without departing from the scope and spirit of the present invention. All these modifications and changes should be considered within the scope of the present invention as defined in the appended claims.

What is claimed is:

1. A wrist support adapted to be attached to a keyboard in a detachable manner, comprising a plurality of connectors each comprising a plate having a first end adapted to be selectively pivotally connectable to an edge of the keyboard and a second end received within a respective cavity formed on the wrist support, the plate being movable within the cavity between a stowed position where the plate is completely received within the cavity and an extended position where the first end of the plate is extended beyond an edge of the wrist support adapted to be releasably and selectively connected to the keyboard, the cavity having a bottom face and two spaced side walls, each of the side walls having a first flange and a second flange formed thereon to define therebetween a rail to accommodate a lateral side edge of the plate therein and thus allowing the plate to slide with respect thereto, the plate having first paw means that is engageable with ends of the second flanges so as to define the extended position and second paw means releasably engageable with stops provided on the bottom face so as to define the stowed position.

2. The wrist support as claimed in claim 1, wherein the first end of the plate has a pivot provided thereon adapted to be rotatably received and held within a slot provided on the edge of the keyboard so as to pivotally connect the wrist support to the keyboard.

3. The wrist support as claimed in claim 2, wherein the first end of the plate has two notches formed thereon which define a central portion and two side portions of the first end with the side portions being deflectable toward the central portion, each of the side portions having a sideways, pin-like projection which defines the pivot of the plate and wherein the plate is adapted to receive the keyboard through a slot having a recess in the keyboard which has two end walls.

* * * * *